US011358254B2

(12) United States Patent
Gorgan et al.

(10) Patent No.: US 11,358,254 B2
(45) Date of Patent: *Jun. 14, 2022

(54) ABRASIVE ARTICLE

(71) Applicant: 3M INNOVATIVE PROPERTIES COMPANY, St. Paul, MN (US)

(72) Inventors: Adriana C. Gorgan, Ontario (CA); Ceni Jacob, Ontario (CA); Joseph J. Migchels, Ontario (CA); Yugeun P. Yang, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 840 days.

This patent is subject to a terminal disclaimer.

(21) Appl. No.: 16/092,429

(22) PCT Filed: Dec. 23, 2016

(86) PCT No.: PCT/US2016/068486
§ 371 (c)(1),
(2) Date: Oct. 9, 2018

(87) PCT Pub. No.: WO2017/180205
PCT Pub. Date: Oct. 19, 2017

(65) Prior Publication Data
US 2020/0331120 A1    Oct. 22, 2020

Related U.S. Application Data

(60) Provisional application No. 62/321,971, filed on Apr. 13, 2016.

(51) Int. Cl.
*B24D 11/00*    (2006.01)
*B24D 3/28*    (2006.01)
(Continued)

(52) U.S. Cl.
CPC ............ *B24D 11/001* (2013.01); *B24D 3/28* (2013.01); *C09K 3/1409* (2013.01);
(Continued)

(58) Field of Classification Search
CPC .... B24D 3/28; B24D 11/001; B24D 18/0009; B24D 11/02; B24D 11/00; B24D 11/005;
(Continued)

(56) References Cited

U.S. PATENT DOCUMENTS 4,988,554 A    1/1991    Peterson
5,201,916 A    4/1993    Berg
(Continued)

FOREIGN PATENT DOCUMENTS

EP    0740980    11/1996
JP    2003-103929    4/2003
(Continued)

OTHER PUBLICATIONS

International Search Report for PCT International Application No. PCT/US2016/069266, dated May 15, 2017, 4 pages.
(Continued)

*Primary Examiner* — Pegah Parvini

(57) ABSTRACT

Abrasive articles, along with related compositions and methods, are provided. A first aspect relates to an abrasive article comprising a backing and an abrasive layer disposed on a major surface of the backing. The abrasive layer comprises a particulate mixture comprising formed abrasive particles and diluent abrasive particles. Based on the overall weight of the particulate mixture, about 0 wt. % to less than 10 wt. % formed abrasive particles having a substantially monodisperse particle size of from about 80 micrometers to about 120 micrometers; and about greater than 90 wt. % to about
(Continued)

99 wt. % diluent abrasive particles having a median particle size of from about 50 micrometers to about 250 micrometers.

22 Claims, 2 Drawing Sheets

(51) Int. Cl.
    *C09K 3/14* (2006.01)
    *B24D 3/00* (2006.01)
    *B24D 11/02* (2006.01)
(52) U.S. Cl.
    CPC ............ *C09K 3/1436* (2013.01); *B24D 3/004* (2013.01); *B24D 11/02* (2013.01); *B24D 2203/00* (2013.01)
(58) Field of Classification Search
    CPC .... B24D 18/00; B24D 18/0027; B24D 11/04; B24D 18/0072; B24D 3/32; B24D 3/34; B24D 99/005; B24D 3/002; B24D 3/004; B24D 3/344; B24D 5/04; B24D 11/008; B24D 3/06; B24D 5/06; B24D 7/02; B24D 7/04; B24D 11/003; B24D 13/10; B24D 13/145; B24D 18/0063; B24D 3/001; B24D 3/02; B24D 3/20; B24D 3/22; B24D 3/285; B24D 5/02; B24D 5/12; B24D 5/14; B24D 5/16; B24D 7/14; B24D 7/16; B24D 11/006; B24D 13/04; B24D 13/14; B24D 13/147; B24D 18/0054; B24D 2203/00; B24D 3/005; B24D 3/007; B24D 3/26; B24D 3/342; B24D 3/348; B24D 7/18; C09K 3/1463; C09K 3/1436; C09K 3/1409; C09K 3/1472; C09K 3/1445; C09K 13/00; C09K 13/06; C09K 3/1454; C09K 8/80; C09K 8/805
    See application file for complete search history.

(56) References Cited

U.S. PATENT DOCUMENTS

| | | | |
|---|---|---|---|
| 5,372,620 A | 12/1994 | Rowse | |
| 5,596,027 A * | 1/1997 | Mead | C09D 11/30 106/31.43 |
| RE35,570 E | 7/1997 | Rowenhorst | |
| 5,700,302 A | 12/1997 | Stoetzel | |
| 5,849,052 A * | 12/1998 | Barber, Jr. | B24D 3/28 51/298 |
| 5,984,998 A | 11/1999 | Ottesen | |
| 6,183,677 B1 | 2/2001 | Usui | |
| 6,197,076 B1 | 3/2001 | Braunschweig | |
| 6,228,133 B1 | 5/2001 | Thurber | |
| 6,261,682 B1 * | 7/2001 | Law | B24D 3/34 428/343 |
| 6,372,323 B1 | 4/2002 | Kobe | |
| 6,428,407 B1 * | 8/2002 | Elder | B24D 11/00 283/101 |
| 6,682,574 B2 | 1/2004 | Carter | |
| 6,773,474 B2 | 8/2004 | Koehnle | |
| 7,329,175 B2 | 2/2008 | Woo | |
| 8,425,278 B2 | 4/2013 | Culler | |
| 9,017,150 B2 | 4/2015 | Keipert | |
| 2003/0079415 A1* | 5/2003 | Carter | C08G 12/12 51/295 |
| 2004/0144037 A1 | 7/2004 | Carter | |
| 2009/0169816 A1 | 7/2009 | Erickson | |
| 2011/0053460 A1 | 3/2011 | Culler | |
| 2011/0162287 A1* | 7/2011 | Cai | B24D 11/001 51/298 |
| 2012/0231711 A1 | 9/2012 | Keipert | |
| 2013/0337725 A1* | 12/2013 | Monroe | C04B 35/1115 451/39 |
| 2013/0344786 A1 | 12/2013 | Keipert | |
| 2015/0267097 A1 | 9/2015 | Rosenflanz | |
| 2017/0043450 A1* | 2/2017 | Graham | B24D 3/002 |
| 2018/0104793 A1* | 4/2018 | Franke | B24D 3/14 |

FOREIGN PATENT DOCUMENTS

| | | |
|---|---|---|
| WO | WO 2014-160578 | 10/2014 |
| WO | WO 2014-176108 | 10/2014 |
| WO | WO 2016-073227 | 5/2016 |
| WO | WO 2016-085791 | 6/2016 |
| WO | WO 2016-160357 | 10/2016 |
| WO | WO 2017-180210 | 10/2017 |

OTHER PUBLICATIONS

International Search Report for PCT International Application No. PCT/US2016/068486, dated May 10, 2017, 4 pages.

\* cited by examiner

ABRASIVE ARTICLE

CROSS REFERENCE TO RELATED APPLICATIONS

This application is a national stage filing under 35 U.S.C. 371 of PCT/US2016/068486, filed Dec. 23, 2016, which claims the benefit of U.S. Application No. 62/321,971, filed Apr. 13, 2016, the disclosure of which is incorporated by reference in its/their entirety herein.

FIELD OF THE INVENTION

Provided are abrasive articles, along with related compositions and methods of use. The provided abrasive articles can be useful in, for example, abrading soft materials such as painted automotive surfaces.

BACKGROUND

Abrasive articles are widely used by consumers, manufacturers, and service providers to perform sanding and finishing operations on almost any given substrate, or workpiece. Such workpieces can be diverse in nature and can have surfaces made of plastic, wood, metal, ceramic materials or combinations of such materials.

Useful abrasive articles are generally made by affixing abrasive particles onto a backing, which can be either rigid or flexible. In some cases, the abrasive particles are uniformly mixed with a polymeric binder to form a slurry, which is then coated onto the backing and cured to provide the final product. Alternatively, the abrasive particles can be directly adhered to the surface of the backing by at least partially embedding them in curable resins called "make" and "size" coats. An advantage of the latter approach is that the abrasive particles can be aligned in a predictable orientation on the working surface, enabling the substrate material to be removed efficiently.

Colored flexible abrasive articles having an abrasive sheet of a particular color and that may have a graphic image permanently imparted (or "printed") onto the abrasive sheet offer unique benefits to both manufacturers and consumers. The ability to have an abrasive sheet of a particular color or to place graphics on the sheet can enhance its appearance and provide branding or promotional information. The color of the abrasive sheet and/or printed information on the sheet can also be effective in communicating technical details to the end user, such as its grit size, or safety information. Printing ornamental and functional images directly on the abrasive is sometimes preferred over placing them on product packaging because abrasive products frequently become separated from their packaging.

SUMMARY

For the color and/or the printed information on an abrasive sheet to come through, it is beneficial to have a supersize coating that is substantially transparent without the use of a surfactant, such as DOWANOL® DPnP. Though such agents can aid in making a supersize coating substantially transparent, they should be avoided due to the fact that they are considered volatile organic compounds (VOCs).

Disclosed herein are abrasive articles comprising supersize compositions (e.g., coatings) that, surprisingly, display improved translucency even when a surfactant is not used to prepare the composition used to form the supersize compositions. Also disclosed are abrasive articles comprising an abrasive layer comprising formed abrasive particles, such as precision-shaped grain (PSG) mineral particles, and diluent abrasive particles. In some examples, even though the abrasive layer comprises relatively low amounts of formed abrasive particles relative to the amounts of diluent abrasive particles (e.g., less than 10 wt. % PSG mineral particles), one observes improved cut rates and/or cut life relative to abrasive articles comprising abrasive layers comprising 10 wt. % or more formed abrasive particles. In addition, abrasive articles comprising the abrasive layers described herein exhibit improved translucency in addition to a surprisingly high cut rate and cut life.

A first aspect relates to an abrasive article comprising a backing and an abrasive layer disposed on a major surface of the backing. The abrasive layer comprises a particulate mixture comprising formed abrasive particles and diluent abrasive particles. Based on the overall weight of the particulate mixture, the particulate mixture comprises about 0 wt. % to less than 10 wt. % formed abrasive particles having a substantially monodisperse particle size of from about 80 micrometers to about 120 micrometers; and about greater than 90 wt. % to about 99 wt. % diluent abrasive particles having a median particle size of from about 50 micrometers to about 250 micrometers.

Figure 1:
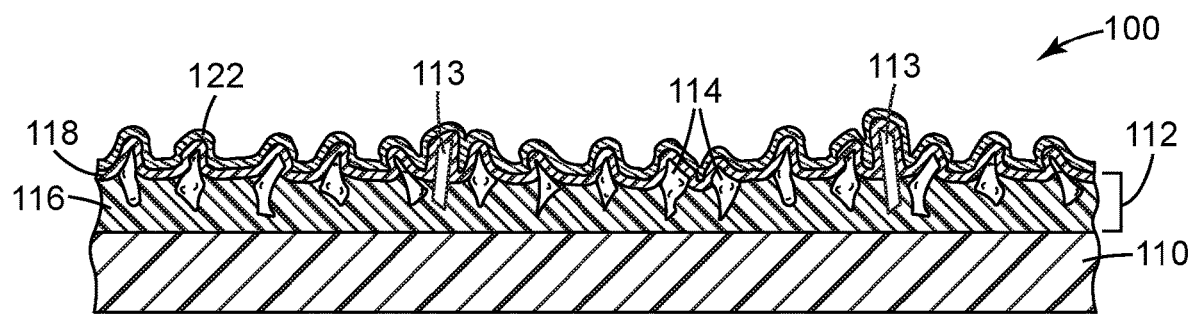
FIGS. 1-5 are side cross-sectional views of abrasive articles according to various examples.

Repeated use of reference characters in the specification and drawings is intended to represent the same or analogous features or elements of the disclosure. It should be understood that numerous other modifications and examples can be devised by those skilled in the art, which fall within the scope and spirit of the principles of the disclosure. Figures may not be drawn to scale.

DETAILED DESCRIPTION

Described herein are abrasive articles, supersize compositions, and methods of making and using the same.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way.

The term "substantially" as used herein generally refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Further details on abrasive article constructions, backings, abrasive layers, supersize coats, and attachments layers are described in respective subsections below.

Abrasive Article Construction

FIG. 1 shows one example of an abrasive article referred to by the numeral 100. As shown, the abrasive article 100 includes a plurality of layers. From the bottom to the top, with the abrasive surface facing upwards, these layers include: a backing 110, an abrasive layer 112, and a supersize coat 122. Here, the abrasive layer 112 is itself multi-layered and includes a make coat 116, formed abrasive particles (e.g., PSG mineral particles) 113 and diluent abrasive particles 114, and a size coat 118.

Figure 2:
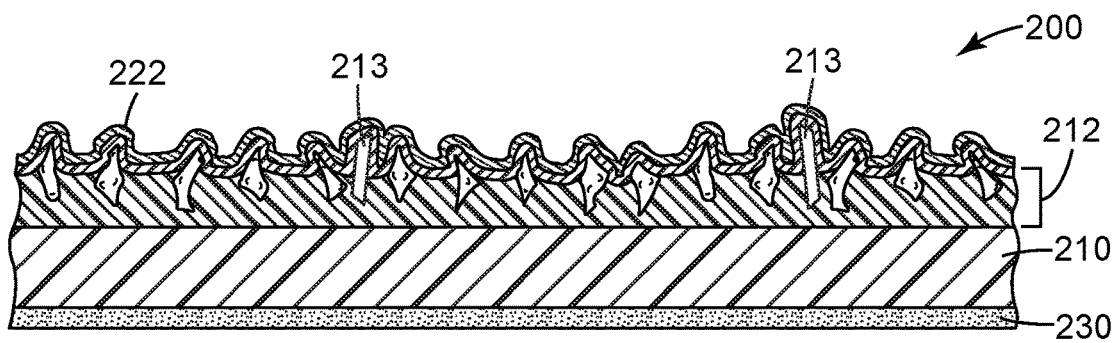

FIG. 2, like FIG. 1, shows an abrasive article 200 having a backing 210, abrasive layer 212, and supersize coat 222. The abrasive article 200 additionally has a continuous attachment layer 230 that extends across and directly contacts a major surface of the backing 210 facing away from the abrasive layer 212. In one example, the attachment layer 230 is a removable pressure-sensitive adhesive.

Figure 3:
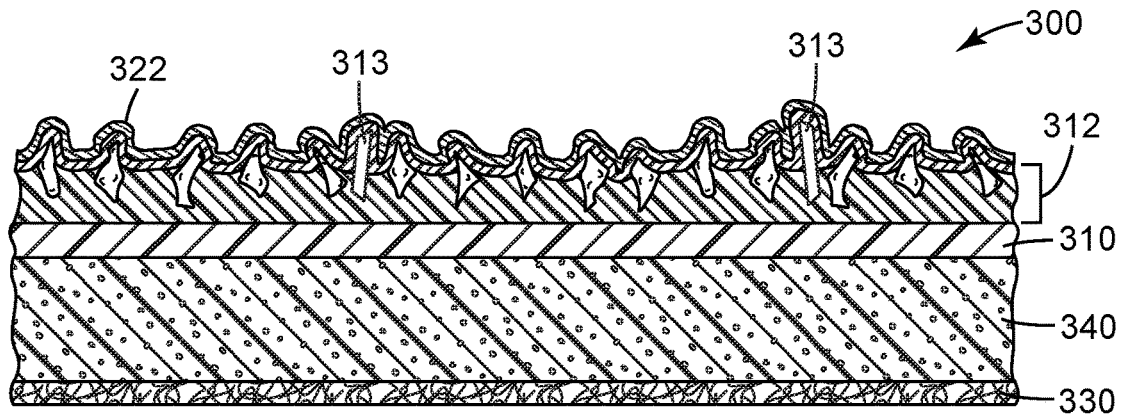

FIG. 3, like FIGS. 1 and 2, shows an abrasive article 300 having a backing 310, abrasive layer 312, and supersize coat 322. Like the abrasive article 200 in FIG. 2, the abrasive article 300 has an attachment layer 330. In this example, the attachment layer 330 is one part of a hook-and-loop attachment mechanism. A polymeric compressible foam 340 can be interposed between the backing 310 and the attachment layer 330. Optionally but not shown, one or more additional layers could be disposed between any of the above layers to help adhere layers to each other, provide a printed image, act as a barrier layer, or serve any other purpose known in the art. By providing compressibility to the abrasive article 300, the compressible foam 340 can enable a more uniform contact with the workpiece to the abraded, and particularly so where the workpiece has non-planar contours. As a further option, the backing 310 and compressible foam 340 could be consolidated into a single layer that serves both functions.

Figure 4:
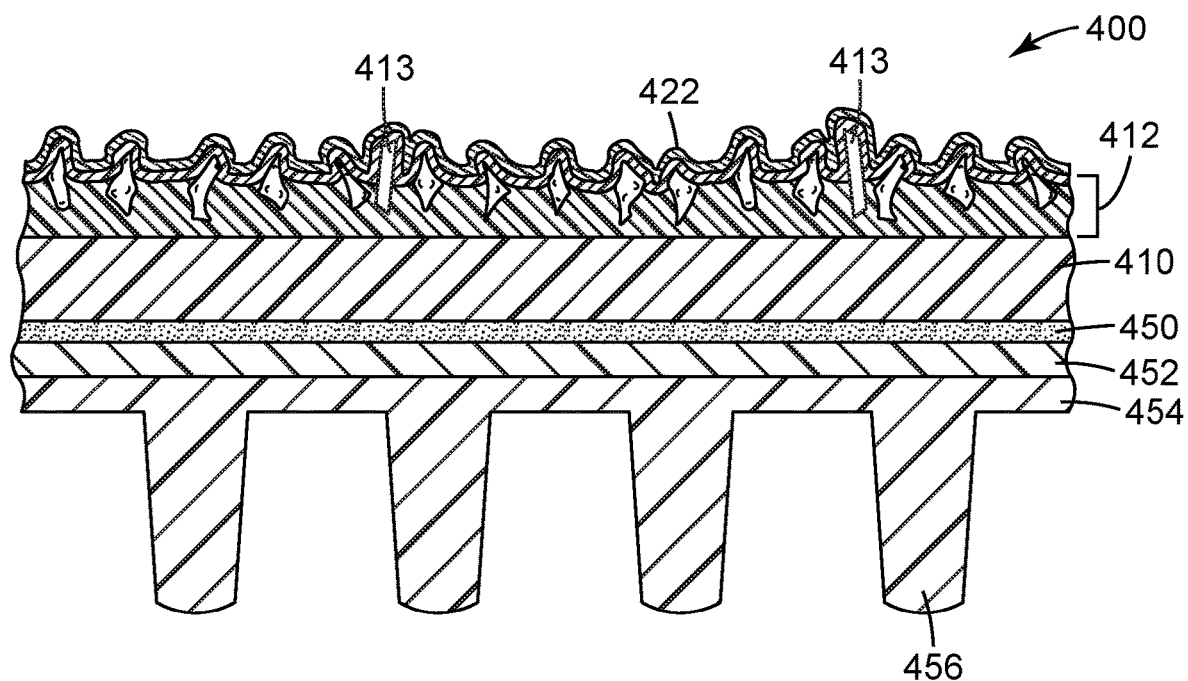

FIG. 4, like FIGS. 1-3, shows an abrasive article 400 having a backing 410, abrasive layer 412, and supersize coat 422. The abrasive article 400 further includes an adhesive layer 450 bonding the backing 410 to an underlying reinforcing layer 452, which is in turn adhered to a gripping layer 454. In some examples, the gripping layer 454 includes integral protrusions 456 that extend outwardly from the backing and assist the operator in handling the abrasive article 400. To provide improved handling of the abrasive article 400, it is beneficial for the gripping layer 454 to be made from an elastomeric polymer, and in some examples, elastomeric polymers having a Shore A hardness ranging from 5 to 90. Further information concerning useful materials and geometries for the gripping layer 454 are described in U.S. Pat. No. 6,372,323 (Kobe et al.) and co-pending International Patent Application No. WO2016/085791 (Graham et al.), both of which are incorporated by reference as if fully set forth herein.

Figure 5:
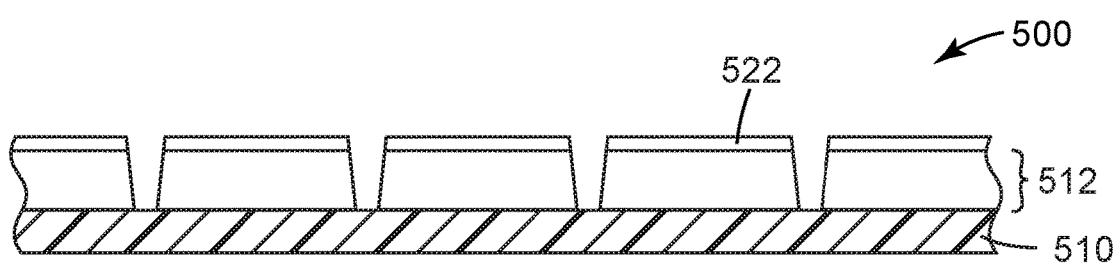

FIG. 5, like FIGS. 1-4, shows an abrasive article 500 having a backing 510, abrasive layer 512, and supersize coat 522. The abrasive article 500 differs from the others in that the abrasive layer 512 is comprised of discontinuous, or discrete, islands of a hardened abrasive composite. Such a composite can be made by uniformly mixing abrasive particles with a binder to form a viscous slurry. This slurry can then be cast and appropriately hardened (for example, using a thermal or radiation curing process) onto a backing 510 to obtain the abrasive layer 512, as shown in FIG. 5.

Advantageously, the abrasive slurry can be cast between the underlying film and a mold having tiny geometric cavities prior to hardening. After hardening, the resulting abrasive coating is molded into a plurality of tiny, precisely shaped abrasive composite structures affixed to the underlying film. The hardening of the binder can be achieved by a curing reaction triggered by heat or exposure to actinic radiation. Examples of actinic radiation include, for example, an electron beam, ultraviolet light, or visible light.

The layer configurations described above are not intended to be exhaustive, and it is to be understood that layers can be added or removed with respect to any of the examples depicted in FIGS. 1-5.

Backing

The aforementioned abrasive articles generally include a backing, such as any of backings 110, 210, 310 410, 510 above. The backing may be constructed from any of a number of materials known in the art for making coated abrasive articles. Although not necessarily so limited, the backing can have a thickness of at least 0.02 millimeters, at least 0.03 millimeters, 0.05 millimeters, 0.07 millimeters, or 0.1 millimeters. The backing could have a thickness of up to 5 millimeters, up to 4 millimeters, up to 2.5 millimeters, up to 1.5 millimeters, or up to 0.4 millimeters.

In some examples, the backing is flexible and may be either solid (as shown in FIG. 1) or porous. Flexible backing materials include polymeric film (including primed films) such as polyolefin film (e.g., polypropylene including biaxially oriented polypropylene, polyester film, polyamide film, cellulose ester film), polyurethane rubber, metal foil, mesh, polymeric foam (e.g., natural sponge material or polyurethane foam), cloth (e.g., cloth made from fibers or yarns comprising polyester, nylon, silk, cotton, and/or rayon), scrim, paper, coated paper, vulcanized paper, vulcanized fiber, nonwoven materials, combinations thereof, and treated versions thereof. The backing may also be a laminate of two materials (e.g., paper/film, cloth/paper, film/cloth). Cloth backings may be woven or stitch bonded. In some examples, the backing is a thin and conformable polymeric film capable of expanding and contracting in transverse (i.e. in-plane) directions during use.

In some examples, a strip of such a backing material that is 5.1 centimeters (2 inches) wide, 30.5 centimeters (12 inches) long, and 0.102 millimeters (4 mils) thick and subjected to a 22.2 Newton (5 Pounds-Force) dead load longitudinally stretches at least 0.1%, at least 0.5%, at least 1.0%, at least 1.5%, at least 2.0%, at least 2.5%, at least 3.0%, or at least 5.0%, relative to the original length of the strip. In other examples, the backing strip longitudinally stretches up to 20%, up to 18%, up to 16%, up to 14%, up to 13%, up to 12%, up to 11%, or up to 10%, relative to the original length of the strip. The stretching of the backing material can be elastomeric (with complete spring back), inelastic (with zero spring back), or combination of elastomeric and inelastic stretching. This property can help promote contact between the diluent abrasive particles 114 and the underlying workpiece, and can be especially beneficial when the workpiece includes raised and/or recessed areas.

Useful backing materials can be highly conformable. Highly conformable polymers that may be used in the backing include certain polyolefin copolymers, polyurethanes, and polyvinyl chloride. An examples of a polyolefin copolymer is an ethylene-acrylic acid resin (available under the trade designation "PRIMACOR 3440" from Dow Chemical Company, Midland, Mich.). Optionally, ethylene-acrylic acid resin is one layer of a bilayer film in which the other layer is a polyethylene terephthalate ("PET") carrier film. In this example, the PET film is not part of the backing itself and is stripped off prior to using the abrasive article 100. While it is possible to strip the PET from the ethylene-acrylic acid resin surface, the ethylene-acrylic acid resin and the PET can also be bonded such that these two layers stay together during use of the abrasive article.

In some examples, the backing has a modulus of at least 10, at least 12, or at least 15 kilogram-force per square centimeter ($kgf/cm^2$). In some examples, the backing has a modulus of up to 200, up to 100, or up to 30 kgf/cm$^2$. The backing can have a tensile strength at 100% elongation (double its original length) of at least 200 kgf/cm$^2$, at least 300 kgf/cm$^2$, or at least 350 kgf/cm$^2$. The tensile strength of the backing can be up to 900 kgf/cm$^2$, up to 700 kgf/cm$^2$, or up to 550 kgf/cm$^2$. Backings with these properties can provide various options and advantages, some of which are described in U.S. Pat. No. 6,183,677 (Usui et al.), which is incorporated by reference as if fully set forth herein.

Optionally, the backing may have at least one of a saturant, presize layer, or backsize layer. These materials can be used to seal the backing or to protect yarn or fibers present in the backing. If the backing is a cloth material, at least one of these materials is typically used. Advantageously, the addition of the presize layer or backsize layer can provide a smoother surface on either the front and/or the back side of the backing. Other optional layers known in the art may also be used, as described in U.S. Pat. No. 5,700,302 (Stoetzel et al.), which is incorporated by reference as if fully set forth herein.

Abrasive Layer

The abrasive layer is a layer containing a hard mineral that serves to abrade the workpiece. In FIGS. 1-4, the abrasive layer is a coated abrasive film that includes a particulate mixture comprising a plurality of formed abrasive particles (e.g., PSG mineral particles) 113 and a plurality of diluent abrasive particles 114 secured to a plurality of hardened resin layers. In some examples, the formed abrasive particles 113 and the diluent abrasive particles 114 are adhesively coupled to the backing by implementing a sequence of coating operations involving a hardenable make coat 116 and size coat 118. It is common for the make coat 116 to include a curable polymeric resin in which the formed abrasive particles 113 and the diluent abrasive particles 114 are at least partially embedded and the size coat 118 to include the same or optionally a different curable polymeric resin disposed on the make coat 116.

In some examples, the formed abrasive particles 113 and the diluent abrasive particles 114 are substantially on the same plane, such that at rest, the formed abrasive particles 113 and the diluent abrasive particles 114 simultaneously contact the surface to be cut with the abrasive article. In other examples, the formed abrasive particles 113 and the diluent abrasive particles 114 can be arranged as shown in FIGS. 1-4, wherein the formed abrasive particles 113 and the diluent abrasive particles 114 are on a different plane, such that at rest, substantially only the formed abrasive particles 113 simultaneously contact the surface to be cut with the abrasive article. In still other examples, the formed abrasive particles 113 and the diluent abrasive particles 114 can be arranged such that the formed abrasive particles 113 and the diluent abrasive particles 114 are on a different plane, such that at rest, substantially only the diluent abrasive particles 114 simultaneously contact the surface to be cut with the abrasive article. Whether the formed abrasive particles 113 and the diluent abrasive particles 114 are on the same or a different plane will depend, in some examples, on the relative size of the formed abrasive particles 113 and the diluent abrasive particles 114. And one can select, in some examples, the relative sizes of the formed abrasive particles 113 and the diluent abrasive particles 114 to achieve any of the arrangements described herein where the formed abrasive particles 113 and the diluent abrasive particles 114 are on the same or different planes.

As used herein, the term "formed abrasive particles" generally refers to abrasive particles (e.g., formed ceramic abrasive particles) having at least a partially replicated shape. Non-limiting processes to make formed abrasive particles include shaping the precursor abrasive particle in a mold having a predetermined shape, extruding the precursor abrasive particle through an orifice having a predetermined shape, printing the precursor abrasive particle though an opening in a printing screen having a predetermined shape, or embossing the precursor abrasive particle into a predetermined shape or pattern. Non-limiting examples of formed abrasive particles are disclosed in Published U.S. Patent Appl. No. 2013/0344786, which is incorporated by reference as if fully set forth herein. Non-limiting examples of formed abrasive particles include shaped abrasive particles formed in a mold, such as triangular plates as disclosed in U.S. Pat. Nos. RE 35,570; U.S. Pat. No. 5,201,916, and 5,984,998 all of which are incorporated by reference as if fully set forth herein; or extruded elongated ceramic rods/filaments often having a circular cross section produced by Saint-Gobain Abrasives an example of which is disclosed in U.S. Pat. No. 5,372,620, which is incorporated by reference as if fully set forth herein. Formed abrasive particle as used herein excludes randomly sized abrasive particles obtained by a mechanical crushing operation.

Formed abrasive particles also include shaped abrasive particles. As used herein, the term "shaped abrasive particle," generally refers to abrasive particles with at least a portion of the abrasive particles having a predetermined shape that is replicated from a mold cavity used to form the shaped precursor abrasive particle. Except in the case of abrasive shards (e.g. as described in U.S. patent publication US 2009/0169816), the shaped abrasive particle will generally have a predetermined geometric shape that substantially replicates the mold cavity that was used to form the shaped abrasive particle. Shaped abrasive particle as used herein excludes randomly sized abrasive particles obtained by a mechanical crushing operation.

Formed abrasive particles also include "platey crushed abrasive particles," such as those described in PCT/US2016/022884, which is incorporated by reference as if fully set forth herein. Briefly, the term "platey crushed abrasive particle," generally refers to crushed abrasive particles resembling a platelet and/or flake that is characterized by a thickness that is less than the width and length. For example, the thickness may be less than ½, ⅓, ¼, ⅕, ⅙, ⅐, ⅛, ⅑, or even less than 1/10 of the length and/or width. Likewise, the width may be less than ½, ⅓, ¼, ⅕, ⅙, ⅐, ⅛, ⅑, or even less than 1/10 of the length.

Formed abrasive particles also include precision-shaped grain (PSG) mineral particles, such as those described in Published U.S. Appl. No. 2015/267097, which is incorporated by reference as if fully set forth herein.

The curable (e.g., by thermal means, or by using electromagnetic or particulate radiation) polymeric resins that can be used in the make coat, but in some examples, also in the size, and/or slurry layers of the coated abrasive articles described herein, may be inorganic or organic. Examples of organic resins include glue, thermoplastic resins, phenolic resins, aminoplast resins, urea-formaldehyde resins, melamine-formaldehyde resins, urethane resins, acrylic resins, epoxy resin (including bis-maleimide and fluorene-modified epoxy resins), isocyanurate resin, as well as mixtures thereof. In some examples, the abrasive layer comprises a urea-formaldehyde resin adhesive (e.g., but not necessarily, in the make coat), to which the particulate mixture is adhered to the backing by the urea-formaldehyde resin adhesive.

In the configuration shown in FIGS. 1-4, the formed abrasive particles 113 and the diluent abrasive particles 114 are partially or fully embedded in respective make and size coats 116, 118 in close proximity to the surface of the abrasive article 100. This allows the formed abrasive particles 113 and the diluent abrasive particles 114 to easily come into frictional contact a workpiece when the abrasive article 100 is rubbed against the workpiece.

The formed abrasive particles and the diluent abrasive particles can be made of the same or different materials. For example, formed abrasive particles 113 and the diluent abrasive particles 114 are not limited and may be composed of any of a variety of hard minerals known in the art. Examples of suitable abrasive particles include, for example, fused aluminum oxide, heat treated aluminum oxide, white fused aluminum oxide, black silicon carbide, green silicon carbide, titanium diboride, boron carbide, silicon nitride, tungsten carbide, titanium carbide, diamond, cubic boron nitride, hexagonal boron nitride, garnet, fused alumina zirconia, alumina-based sol gel derived abrasive particles, silica, iron oxide, chromia, ceria, zirconia, titania, tin oxide, gamma alumina, and mixtures thereof. The alumina abrasive particles may contain a metal oxide modifier. The diamond and cubic boron nitride abrasive particles may be monocrystalline or polycrystalline.

The formed abrasive particles 113 can be made according to methods known in the art including the methods described in Published U.S. Appl. No. 2015/267097, which is incorporated by reference as if fully set forth herein.

In some examples, the formed abrasive particles 113 have a substantially monodisperse particle size of from about 80 micrometers to about 150 micrometers (e.g., from about 75 micrometers to about 150 micrometers; about 90 micrometers to about 110 micrometers; about 90 micrometers to about 100 micrometers; about 85 micrometers to about 110 micrometers; or about 95 micrometers to about 120 micrometers). As used herein, the term "substantially monodisperse particle size" is used to describe formed abrasive particles having a size that does not vary substantially. Thus, for example, when referring to formed abrasive particles (e.g., a PSG mineral particles) having a particle size of 100 micrometers, greater than 90%, greater than 95% or greater than 99% of the formed abrasive particles will have a particle having its largest dimension be 100 micrometers.

In contrast, the diluent abrasive particles 114 have a range or distribution of particle sizes. Such a distribution can be characterized by its median particle size. For instance, the median particle size of the abrasive particles may be at least 0.001 micrometers, at least 0.005 micrometers, at least 0.01 micrometers, at least 0.015 micrometers, or at least 0.02 micrometers. In some instances, the median particle size of the abrasive particles may be up to 300 micrometers, up to 275 micrometers, up to 250 micrometers, up to 150 micrometers, or up to 100 micrometers. In some examples, the median particle size of the diluent abrasive particles is from about 50 micrometers to about 250 micrometers (e.g., a median particle size from about 50 micrometers to about 100 micrometers; about 75 micrometers to about 150 micrometers; about 100 micrometers to about 200 micrometers; or about 100 micrometers to about 250 micrometers).

In some examples, the formed abrasive particles and the diluent abrasive particles are present in the particulate mixture comprised in the abrasive layer in different weight percent (wt. %) amounts relative to one another, based on the overall weight of the particulate mixture. In some examples, the particulate mixture comprises from about 0 wt. % to less than 10 wt. % formed abrasive particles (e.g., from about 1 wt. % to less than 10 wt. %, about 1 wt. % to about 5 wt. %; about 1 wt. % to about 3 wt. %; about 3 wt. % to about less than 10 wt. %; about 3 wt. % to about 5 wt. %; about 5 wt. % to about less than about 10 wt. %; or about 3 wt. % to about 8 wt. %).

In some examples, the particulate mixture comprises from about greater than 90 wt. % to about 99 wt. % diluent abrasive particles (e.g., from about 91 wt. % to about 97 wt. %; about 92 wt. % to about 97 wt. %; about 95 wt. % to about 97 wt. %; or greater than about 90 wt. % to about 97 wt. %).

FIG. 5 shows an alternative kind of abrasive layer. In this example, the abrasive layer 512 is comprised of discrete islands of an abrasive composite. Such a composite can be made by uniformly mixing abrasive particles with a binder to form a viscous slurry. This slurry can then be cast and appropriately hardened (for example, using a thermal or radiation curing process) onto a backing 510 to afford the abrasive layer 512, as shown in the figure. The cast slurry can be cast onto the backing in a continuous layer or a patterned, discontinuous layer, as shown in FIG. 5.

Optionally, the abrasive slurry is molded onto a suitable backing to form a structured abrasive. Structured abrasives can be made by mixing abrasive particles and a hardenable precursor resin in a suitable binder resin (or binder precursor) to form a slurry, casting the slurry between the underlying film and a mold having tiny geometric cavities, and then hardening the binder. After hardening, the resulting abrasive coating is molded into a plurality of tiny, precisely shaped abrasive composite structures affixed to the underlying film. The hardening of the binder can be achieved by a curing reaction triggered by heat or exposure to actinic radiation. Examples of actinic radiation include, for example, an electron beam, ultraviolet light, or visible light.

Supersize Coat

In general, the supersize coat is the outermost coating of the abrasive article and directly contacts the workpiece during an abrading operation. The supersize coat is, in some examples, substantially transparent. In some examples, the supersize coat is substantially transparent even when a surfactant, such as dipropylene glycol n-propyl ether, is not used to prepare the composition used to form the supersize coat.

The term "substantially transparent" as used herein refers to a majority of, or mostly, as in at least about 30%, 40%, 50%, 60%, or at least about 70% or more transparent. In some examples, the measure of the transparency of any given coat described herein (e.g., the supersize coat) is the coat's transmittance. In some examples, the supersize coat displays a transmittance of at least 5 percent, at least 20 percent, at least 40 percent, at least 50 percent, or at least 60 percent (e.g., a transmittance from about 40 percent to about 80 percent; about 50 percent to about 70 percent; about 40 percent to about 70 percent; or about 50 percent to about 70 percent), according to a Transmittance Test that measures the transmittance of 500 nm light through a sample of 6 by 12 inch by approximately 1-2 mil (15.24 by 30.48 cm by 25.4-50.8 $\Box$m) clear polyester film, having a transmittance of about 98%.

One component of supersize coats is a metal salt of a long-chain fatty acid (e.g., a $C_{12}$-$C_{22}$ fatty acid, a $C_{14}$-$C_{18}$ fatty acid, and a $C_{16}$-$C_{20}$ fatty acid). In some examples, the metal salt of a long-chain fatty acid is a stearate salt (e.g., a salt of stearic acid). The conjugate base of stearic acid is $C_{17}H_{35}COO^-$, also known as the stearate anion. Useful stearates include, but are not limited to, calcium stearate, zinc stearate, and combinations thereof.

The metal salt of a long-chain fatty acid can be present in an amount of at least 10 percent, at least 50 percent, at least 70 percent, at least 80 percent, or at least 90 percent by weight based on the normalized weight of the supersize coat (i.e., the average weight for a unit surface area of the abrasive article). The metal salt of a long-chain fatty acid can be present in an amount of up to 100 percent, up to 99 percent, up to 98 percent, up to 97 percent, up to 95 percent, up to 90 percent, up to 80 percent, or up to 60 percent by weight (e.g., from about 10 wt. % to about 100 wt. %; about 30 wt. % to about 70 wt. %; about 50 wt. % to about 90 wt. %; or about 50 wt. % to about 100 wt. %) based on the normalized weight of the supersize coat.

Another component of the supersize composition is a polymeric binder, which, in some examples, enables the composition used to form the supersize coat to form a smooth and continuous film over the abrasive layer. In one example, the polymeric binder is a styrene-acrylic polymer binder. In some examples, the styrene-acrylic polymer binder is the ammonium salt of a modified styrene-acrylic polymer, such as, but not limited to, JONCRYL® LMV 7051. The ammonium salt of a styrene-acrylic polymer can have, for example, a weight average molecular weight ($M_w$) of at least 100,000 g/mol, at least 150,000 g/mol, at least 200,000 g/mol, or at least 250,000 g/mol (e.g., from about 100,000 g/mol to about $2.5 \times 10^6$ g/mol; about 100,000 g/mol to about 500,000 g/mol; or about 250,000 to about $2.5 \times 10^6$ g/mol).

The minimum film-forming temperature, also referred to as MFFT, is the lowest temperature at which a polymer self-coalesces in a semi-dry state to form a continuous polymer film. In the context of the present disclosure, this polymer film can then function as a binder for the remaining solids present in the supersize coat. In some examples, the styrene-acrylic polymer binder (e.g., the ammonium salt of a styrene-acrylic polymer) has an MFFT that is up to 90° C., up to 80° C., up to 70° C., up to 65° C., or up to 60° C.

In some examples, the binder is dried at relatively low temperatures (e.g., at 70° C. or less). The drying temperatures are, in some examples, below the melting temperature of the metal salt of a long-chain fatty acid component of the supersize coat. Use of excessively high temperatures (e.g., temperatures above 80° C.) to dry the supersize coat is undesirable because it can induce brittleness and cracking in the backing, complicate web handling, and increase manufacturing costs. By virtue of its low MFFT, a binder comprised of, e.g., the ammonium salt of a styrene-acrylic polymer allows the supersize coat to achieve better film formation at lower binder levels and at lower temperatures without need for added surfactants such as DOWANOL® DPnP.

The polymeric binder can be present in an amount of at least 0.1 percent, at least 1 percent, or at least 3 percent by weight, based on the normalized weight of the supersize coat. The polymeric binder can be present in an amount of up to 20 percent, up to 12 percent, up to 10 percent, or up to 8 percent by weight, based on the normalized weight of the supersize coat. Advantageously, when the ammonium salt of a modified styrene acrylic copolymer is used as a binder, the haziness normally associated with a stearate coating is substantially reduced.

The supersize coats of the present disclosure optionally contain clay particles dispersed in the supersize coat. The clay particles, when present, can be uniformly mixed with the metal salt of a long chain fatty acid, polymeric binder, and other components of the supersize composition. The clay can bestow unique advantageous properties to the abrasive article, such as improved optical clarity and improved cut performance. The inclusion of clay particles can also enable cut performance to be sustained for longer periods of time relative to supersize coats in which the clay additive is absent.

The clay particles, when present, can be present in an amount of at least 0.01 percent, at least 0.05 percent, at least 0.1 percent, at least 0.15 percent, or at least 0.2 percent by weight based on the normalized weight of the supersize coat. Further, the clay particles can be present in an amount of up to 99 percent, up to 50 percent, up to 25 percent, up to 10 percent, or up to 5 percent by weight based on the normalized weight of the supersize coat.

The clay particles may include particles of any known clay material. Such clay materials include those in the geological classes of the smectites, kaolins, illites, chlorites, serpentines, attapulgites, palygorskites, vermiculites, glauconites, sepiolites, and mixed layer clays. Smectites in particular include montmorillonite (e.g., a sodium montmorillonite or calcium montmorillonite), bentonite, pyrophyllite, hectorite, saponite, sauconite, nontronite, talc, beidellite, and volchonskoite. Specific kaolins include kaolinite, dickite, nacrite, antigorite, anauxite, halloysite, indellite and chrysotile. Illites include bravaisite, muscovite, paragonite, phlogopite and biotite. Chlorites can include, for example, corrensite, penninite, donbassite, sudoite, pennine and clinochlore. Mixed layer clays can include allevardite and vermiculitebiotite. Variants and isomorphic substitutions of these layered clays may also be used.

As an optional additive, abrasive performance may be further enhanced by nanoparticles (i.e., nanoscale particles) interdispersed (e.g., in the clay particles) in the supersize coat. Useful nanoparticles include, for example, nanoparticles of metal oxides, such as zirconia, titania, silica, ceria, alumina, iron oxide, vanadia, zinc oxide, antimony oxide, tin oxide, and alumina-silica. The nanoparticles can have a median particle size of at least 1 nanometer, at least 1.5 nanometers, or at least 2 nanometers. The median particle size can be up to 200 nanometers, up to 150 nanometers, up to 100 nanometers, up to 50 nanometers, or up to 30 nanometers.

Other optional components of the supersize composition include curing agents, surfactants, antifoaming agents, biocides, and other particulate additives known in the art for use in supersize compositions.

The supersize coat can be formed, in some examples, by providing a supersize composition in which the components are dissolved or otherwise dispersed in a common solvent. In some examples, the solvent is water. After being suitably mixed, the supersize dispersion can be coated onto the underlying layers of the abrasive article and dried to provide the finished supersize coat. If a curing agent is present, the supersize composition can be cured (e.g., hardened) either thermally or by exposure to actinic radiation at suitable wavelengths to activate the curing agent.

The coating of the supersize composition onto, e.g., the abrasive layer can be carried out using any known process. In some examples, the supersize composition is applied by spray coating at a constant pressure to achieve a predetermined coating weight. Alternatively, a knife coating method where the coating thickness is controlled by the gap height of the knife coater can be used.

Attachment Layers

An attachment layer can be affixed to the backing to help secure the abrasive article to a sanding block, power tool, or even the hand of an operator. In FIG. 2, the attachment layer 230 is comprised of a pressure-sensitive adhesive. The attachment layer can also use a mechanical retention mechanism. In FIG. 3, the attachment layer 330 is comprised of a fibrous material, such as a scrim or non-woven material forming half of a hook and loop attachment system. The other half can be provided, for example, on a sanding block or the movable chuck of a power tool. Such attachment systems are advantageous because they allow the abrasive article to be easily replaced when worn out.

EXAMPLES

Objects and advantages of this disclosure are further illustrated by the following non-limiting examples, but the particular materials and amounts thereof recited in these examples, as well as other conditions and details, should not be construed to unduly limit this disclosure.
The following abbreviations are used to describe the examples:
° C.: degrees Centigrade
cm: centimeter
cm/s: centimeters per second
ctg. wt.: coating weight
g/m$^2$: grams per square meter
in/s: inches per second
Kg: kilogram
lb: pound
MFFT: minimum film forming temperature
min: minute
mL: milliliter
μm: micrometer
nm: nanometer
rpm: revolutions per minute
$T_g$: glass transition temperature
wt. %: weight percent Unless stated otherwise, all reagents were obtained or are available from chemical vendors such as Sigma-Aldrich Company, St. Louis, Mo., or may be synthesized by known methods. Unless otherwise reported, all ratios are by dry weight.

Abbreviations for materials and reagents used in the examples are as follows:
DPnP: Dipropylene glycol n-butyl ether, obtained under the trade designation "DOWANOL DPnP" from Dow Chemical Company, Midland, Mich.
HL27: An antifoaming agent, obtained under the trade designation "HL27" from Harcross, Inc., St. Paul, Minn.
J-89: A 48.0 wt. % aqueous, non-film forming, styrene acrylic emulsion, having an MFFT of greater than 80° C. and a $T_g$ of 98° C., obtained under the trade designation "JONCRYL J89" from BASF Company, Ludwigshafen, Germany.
J-7051: A 44.5 wt. % aqueous, non-film forming, styrene acrylic emulsion, having an MFFT of 56° C. and a $T_g$ of 98° C., obtained under the trade designation "JONCRYL LMV 7051" from BASF Company.
LS-233: A 52 wt. % aqueous calcium stearate dispersion, obtained under the trade designation "LOXANOL MI S233" from Geo Specialty Chemicals, Inc., Ambler, Pa.

Coated Abrasives
Comparative A
A urea-urea-formaldehyde coated abrasive having a grade P150 alumina mineral, obtained under the trade designation "3M RED ABRASIVE STIKIT, 316U P150" from 3M Company, St. Paul, Minn.
Comparative B
A urea-urea-formaldehyde coated abrasive having a grade P180 alumina mineral, obtained under the trade designation "3M RED ABRASIVE STIKIT, 316U P180" from 3M Company.

Comparative C
A urea-urea-formaldehyde coated abrasive having a grade P150 alumina mineral, obtained under the trade designation "3M GOLD ABRASIVE STIKIT, 236U P150" from 3M Company.
Comparative D
A urea-urea-formaldehyde coated abrasive having a grade P180 alumina mineral, obtained under the trade designation "3M GOLD ABRASIVE STIKIT, 236U P180" from 3M Company.
Comparative E
A urea-urea-formaldehyde coated abrasive having a grade P80 alumina mineral, obtained under the trade designation "PRO GRADE NO SLIP HAND SANDING SHEETS, P80" from 3M Company.

Example 1

A coated abrasive as described in Comparative A, wherein 10% by weight of the P150 alumina mineral was substituted with an equal weight of a grade P150+ triangular prism shaped alumina ceramic abrasive grain having a length of 0.245 mm, a thickness of 0.072 mm and a sloping sidewall angle of 8 degrees.

Example 2

A coated abrasive as described in Comparative B, wherein 10% by weight of the P180 alumina mineral was substituted with an equal weight of a grade P180+ triangular prism shaped alumina ceramic abrasive grain having a length of 0.198 mm, a thickness of 0.047 mm and a sloping sidewall angle of 8 degrees.

Example 3

A coated abrasive as described in Comparative C, wherein 10% by weight of the P150 alumina mineral was substituted with an equal weight of a grade P150+ triangular prism shaped alumina ceramic abrasive grain having a length of 0.245 mm, a thickness of 0.072 mm and a sloping sidewall angle of 8 degrees.

Example 4

A coated abrasive as described in Comparative D, wherein 10% by weight of the P180 alumina mineral was substituted with an equal weight of a grade P180+ triangular prism shaped alumina ceramic abrasive grain having a length of 0.198 mm, a thickness of 0.047 mm and a sloping sidewall angle of 8 degrees.

Example 5

A coated abrasive as described in Comparative E, wherein 10% by weight of the P80 alumina mineral was substituted with an equal weight of a grade P80+ triangular prism shaped alumina ceramic abrasive grain having a length of 0.510 mm, a thickness of 0.098 mm and a sloping sidewall angle of 8 degrees.

Example 6

A coated abrasive as described in Comparative E, wherein 5% by weight of the P80 alumina mineral was substituted with an equal weight of a grade P80+ triangular prism shaped alumina ceramic abrasive grain having a length of 0.510 mm, a thickness of 0.098 mm and a sloping sidewall angle of 8 degrees.

Example 7

A coated abrasive as described in Comparative E, wherein 1% by weight of the P80 alumina mineral was substituted with an equal weight of a grade P80+ triangular prism shaped alumina ceramic abrasive grain having a length of 0.510 mm, a thickness of 0.098 mm and a sloping sidewall angle of 8 degrees.

Example 8

A coated abrasive as described in Comparative C, wherein 5% by weight of the P180 alumina mineral was substituted with an equal weight of a grade P180+ triangular prism shaped alumina ceramic abrasive grain having a length of 0.198 mm, a thickness of 0.047 mm and a sloping sidewall angle of 8 degrees.

Test Methods

Sanding Test 1

The abrasive disc was mounted on a 6 inch (15.24 cm) diameter "STIKIT" backup pad, part no. 05576, obtained from 3M Company. This assembly was then attached to the dual action axis of a servo controlled motor, disposed over an X-Y table, with a cellulose acetate butyrate test panel secured to the table. The servo controlled motor was run at 7200 rpm, and the abrasive article urged at an angle of 2.5 degrees against the test panel at a load of 13 lbs (5.90 Kg). The tool was then set to traverse at a rate of 20 in/s (50.80 cm/s) along the width of the panel and traverse along the length of the panel at a rate of 5 in/s (12.70 cm/s). Seven such passes along the length of the panel were completed in each cycle, over a one minute interval, for a total of 5 cycles. The mass of the panel was measured before and after each cycle to determine the total mass lost in grams for each cycle, as well as a cumulative mass loss at the end of 5 cycles. Four abrasive discs were tested per each sample.

Sanding Test 2

Abrasive performance testing was performed on an 18 inches by 24 inches (45.7 cm by 61 cm) black painted cold roll steel test panels having NEXA OEM type clearcoat, obtained from ACT Laboratories, Inc., Hillsdale, Mich. For testing purposes, the abrasive discs were attached to a 6-inch (15.2 cm) backup pad, commercially available under the trade designation "HOOKIT BACKUP PAD, PART NO. 05865", from 3M Company. Sanding was performed using a dual action axis of a servo controlled motor, disposed over an X-Y table, operating at 7200 rpm, and 5/16 inch (7.94 mm) stroke, and the abrasive article urged at an angle of 2.5 degrees against the panel at a load of 13 lbs (5.90 Kg). The tool was then set to traverse at a rate of 20 in/s (50.8 cm/s) along the width of the panel and a traverse along the length of the panel at a rate of 5 in/s (12.7 cm/s). Seven such passes along the length of the panel were completed in each cycle for a total of 3 cycles, for a total of 3 minutes sanding time. The mass of the panel was measured before and after each cycle to determine the total mass lost in grams for each cycle, as well as a cumulative mass loss at the end of 3 cycles. Three abrasive discs were tested per each sample.

Comparatives A-D and Examples 1-4

Comparatives A-D and Examples 1-4 were evaluated for total cut according to Sanding Tests 1 and 2, the results of which are listed in Tables 1 and 2, respectively.

TABLE 1

| Sample | Total Cut (grams) |
|---|---|
| Comparative A | 20.5 |
| Example 1 | 29.77 |
| Comparative B | 20.8 |
| Example 2 | 32.3 |
| Comparative C | 18.3 |
| Example 3 | 23.2 |
| Comparative D | 16.8 |
| Example 4 | 25.2 |

TABLE 2

| Sample | Total Cut (grams) |
|---|---|
| Comparative A | 17.5 |
| Example 1 | 30.1 |
| Comparative B | 14.5 |
| Example 2 | 32.4 |
| Comparative C | 18.1 |
| Example 3 | 40.1 |
| Comparative D | 15.0 |
| Example 4 | 45.0 |

Comparative E and Examples 5-7

Examples 5-7 were evaluated for total cut according to Sanding Test 1, the results of which are listed in Table 3.

TABLE 3

| Sample | Total Cut (grams) |
|---|---|
| Comparative E | 15.95 |
| Example 5 | 29.91 |
| Example 6 | 24.08 |
| Example 7 | 20.50 |

Comparative F

A stearate/styrene acrylic supersize composition was prepared as follows. 88.8 grams calcium stearate dispersion LS233, 8.8 grams styrene acrylic dispersion J-89, 1.8 grams surfactant DPnP and 0.6 grams antifoam agent HL27 were homogeneously dispersed by means of a propeller blade mixer at 500 rpm for 5 minutes at 21° C. Approximately 1 mL of this supersize composition was evenly coated onto the corona treated surface of a 15 by 20 cm by 2 mil (50.8 μm) sheet of clear polyester film using a Meyer rod bar coater and dried for 30 seconds at 70° C. in an air-circulating oven. % Transmittance of the dried coating was then measured at 500 nm using a spectrophotometer and compared to the transparency of only the LS-233 stearate coated on polyester film.

Comparatives G-I and Examples 9-11

Two additional batches of LS-233 calcium stearate were used to make styrene acrylic supersize compositions according to the procedure generally described in Comparative F, according to the quantities listed in Table 4.

TABLE 4

| Supersize Composition | LS-233 Batch | Composition (grams) | | | | | % Transmittance | |
|---|---|---|---|---|---|---|---|---|
| | | LS-233 | J-89 | J-7051 | DPnP | HL27 | LS-233 Batch | Coated Sample |
| Comparative F | 1 | 88.8 | 8.8 | 0 | 1.8 | 0.6 | 61 | 66 |
| Example 9 | 1 | 90.7 | 0 | 8.7 | 0 | 0.63 | 61 | 67 |
| Comparative G | 2 | 88.8 | 8.8 | 0 | 1.8 | 0.6 | 23 | 51 |
| Example 10 | 2 | 90.7 | 0 | 8.7 | 0 | 0.63 | 23 | 61 |
| Comparative H | 3 | 88.8 | 8.8 | 0 | 1.8 | 0.6 | 13 | 38 |
| Comparative I | 3 | 87.2 | 8.6 | 0 | 3.6 | 0.6 | 13 | 49 |
| Example 11 | 3 | 90.7 | 0 | 8.7 | 0 | 0.63 | 13 | 58 |

Example 12

Coated abrasive Example 8 was manufactured without the stearate supersize, and converted into 12 by 25 inch (30.48 by 63.50 cm) sheets. It is to be understood that, to one of ordinary skill in the art, the stearate supersize on a commercially available coated abrasive sheet could be removed merely by gently brushing off said supersize using a dilute aqueous soap solution. Supersize composition Example 9 was then applied to the coated abrasive sheets by means of a laboratory coater and dried at 70° C. for 30 seconds. Comparative C and the Example were evaluated according to Sanding Test 1. Results are listed in Table 5.

TABLE 5

| Sample | Total Cut (grams) |
|---|---|
| Comparative C | 16.0 |
| Example 12 | 24.4 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

The present invention provides for the following Embodiments, the numbering of which is not to be construed as designating levels of importance:

Embodiment 1 relates to an abrasive article comprising: a backing; and an abrasive layer disposed on a major surface of the backing, the abrasive layer comprising: a particulate mixture comprising, based on the overall weight of the particulate mixture: about 0 wt. % to less than 10 wt. % formed abrasive particles having a substantially monodisperse particle size of from about 80 micrometers to about 120 micrometers; and about greater than 90 wt. % to about 99 wt. % diluent abrasive particles having a median particle size of from about 50 micrometers to about 250 micrometers.

Embodiment 2 relates to the abrasive article of Embodiment 1, wherein the formed abrasive particles are precision-shaped grain mineral particles.

Embodiment 3 relates to the abrasive article of Embodiment 1, wherein the particulate mixture comprises about 1 wt. % to about 5 wt. % formed abrasive particles.

Embodiment 4 relates to the abrasive article of Embodiment 2, wherein the particulate mixture comprises about 1 wt. % to about 3 wt. % formed abrasive particles.

Embodiment 5 relates to the abrasive article of any one of Embodiments 1-3, wherein the particulate mixture comprises about 91 wt. % to about 97 wt. % diluent abrasive particles.

Embodiment 6 relates to the abrasive article of Embodiment 4, wherein the particulate mixture comprises about 95 wt. % to about 97 wt. % diluent abrasive particles.

Embodiment 7 relates to the abrasive article of any one of Embodiments 1-5, wherein the diluent abrasive particles comprise aluminum oxide particles.

Embodiment 8 relates to the abrasive article of any one of Embodiments 1-6, wherein the formed abrasive particles have a particle size of from about 90 micrometers to about 110 micrometers.

Embodiment 9 relates to the abrasive article of any one of Embodiments 1-7, wherein the diluent abrasive particles have a median particle size of from 75 micrometers to 150 micrometers.

Embodiment 10 relates to the abrasive article of any one of Embodiments 1-8, wherein the abrasive layer further comprises a urea-formaldehyde resin adhesive, the particulate mixture being adhered to the backing by the urea-formaldehyde resin adhesive.

Embodiment 11 relate to the abrasive article of any one of Embodiments 1-9, wherein the backing comprises paper, polymeric film, polymeric foam, or combination thereof.

Embodiment 12 relates to the abrasive article of any one of Embodiments 1-10, further comprising a supersize coat disposed on a major surface of the abrasive layer opposite the backing, the supersize coat comprising: a metal salt of a long-chain fatty acid; and a styrene-acrylic polymer binder; and optionally, a surfactant.

Embodiment 13 relates to the abrasive article of Embodiment 11, wherein the supersize coat is substantially transparent.

Embodiment 14 relates to the abrasive article of Embodiment 11, wherein the metal salt of a long-chain fatty acid is a stearate salt.

Embodiment 15 relates to the abrasive article of Embodiment 11, wherein the stearate salt is calcium stearate.

Embodiment 16 relates the abrasive article of any one of Embodiments 11-14, wherein the surfactant comprises dipropylene glycol n-propyl ether.

Embodiment 17 relates to the abrasive article of any one of Embodiments 11-15, wherein the supersize coat displays a transmittance of from about 40 percent to about 80 percent according to the Transmittance Test.

Embodiment 18 relates to the abrasive article of any one of Embodiments 11-15, wherein the supersize coat displays a transmittance of from about 50 percent to about 70 percent according to the Transmittance Test.

Embodiment 19 relates to the abrasive article of any one of Embodiments 1-17, further comprising an attachment layer coupled to a major surface of the backing opposite the abrasive layer.

Embodiment 20 relates to the abrasive article of Embodiment 18, wherein the attachment layer comprises a pressure-sensitive adhesive.

Embodiment 21 relates to the abrasive article of any of Embodiments 18-19, wherein the attachment layer comprises part of a hook and loop attachment mechanism.

Embodiment 22 relates to the abrasive article of any of Embodiments 18-20, wherein the attachment layer comprises a plurality of protrusions extending outwardly from the backing, the protrusions comprising a polymer having a Shore A hardness ranging from 5 to 90.

What is claimed is:

1. A supersize coat, comprising
a metal salt of a ($C_{12}$-$C_{22}$) long-chain fatty acid; and
a styrene-acrylic polymer binder, wherein the styrene-acrylic polymer binder has a minimum film-forming temperature of up to 80 degrees Celsius, wherein the styrene-acrylic polymer binder is an ammonium salt of the styrene-acrylic polymer binder.

2. The supersize coat of claim 1, wherein the supersize coat is substantially transparent.

3. The supersize coat of claim 1, wherein the metal salt is of a ($C_{14}$-$C_{18}$) long-chain fatty acid.

4. The supersize coat of claim 3, wherein the metal salt is a stearate salt.

5. The supersize coat of claim 4, wherein the stearate salt is calcium stearate.

6. The supersize coat of claim 1, further comprising dipropylene glycol n-propyl ether.

7. The supersize coat of claim 1, wherein the supersize coat displays a transmittance of from about 40 percent to about 80 percent according to a Transmittance Test.

8. The supersize coat of claim 1, wherein the supersize coat displays a transmittance of at least 50 percent according to a Transmittance Test.

9. The supersize coat of claim 1, wherein the ammonium salt of the styrene-acrylic polymer binder has a weight average molecular weight (Mw) of at least 200,000 g/mol.

10. The supersize coat of claim 1, wherein the metal salt of a ($C_{12}$-$C_{22}$) long-chain fatty acid is present in an amount of up to 95 percent by weight based on the normalized weight of the supersize coat.

11. The supersize coat of claim 10, wherein the styrene-acrylic polymer binder is present in an amount of at least 3 percent by weight based on the normalized weight of the supersize coat.

12. The supersize coat of claim 1, further comprising clay particles dispersed in the supersize coat.

13. The supersize coat of claim 1, wherein the supersize coat does not include a surfactant.

14. The supersize coat of claim 1, wherein the styrene-acrylic polymer binder has a Tg of about 98 degrees Celsius.

15. An abrasive article comprising:
a backing;
an abrasive layer disposed on a major surface of the backing, and
the supersize coat of claim 1 disposed on a major surface of the abrasive layer opposite the backing.

16. The abrasive article of claim 15, wherein the abrasive layer has a graphic image permanently imparted thereon and sandwiched between the abrasive layer and the supersize coat.

17. The abrasive article of claim 16, wherein the graphic image is grit size.

18. The abrasive article of claim 15, wherein the abrasive layer comprises a particulate mixture comprising, based on the overall weight of the particulate mixture:
about 0 wt. % to less than 10 wt. % formed abrasive particles having a substantially monodisperse particle size of from about 80 micrometers to about 120 micrometers; and
about greater than 90 wt. % to about 99 wt. % diluent abrasive particles having a median particle size of from about 50 micrometers to about 250 micrometers.

19. The abrasive article of claim 18, wherein the formed abrasive particles are precision-shaped grain mineral particles.

20. The abrasive article of claim 18, wherein the particulate mixture comprises about 1 wt. % to about 5 wt. % formed abrasive particles.

21. A supersize coat, comprising
a metal salt of a ($C_{12}$-$C_{22}$) long-chain fatty acid; and
a styrene-acrylic polymer binder, wherein the styrene-acrylic polymer binder is an ammonium salt of the styrene-acrylic polymer binder, wherein the ammonium salt of the styrene-acrylic polymer binder has a weight average molecular weight (Mw) of at least 200,000 g/mol.

22. The supersize coat of claim 21, wherein the styrene-acrylic polymer binder has a $T_g$ of about 98 degrees Celsius.

* * * * *